United States Patent
Vermeulen

(10) Patent No.: US 8,417,426 B2
(45) Date of Patent: Apr. 9, 2013

(54) TRACTOR COMPRISING A CONTROL SYSTEM

(75) Inventor: Antoon Vermeulen, Oostkamp (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/510,603

(22) PCT Filed: Oct. 5, 2010

(86) PCT No.: PCT/EP2010/064798
§ 371 (c)(1),
(2), (4) Date: Jul. 30, 2012

(87) PCT Pub. No.: WO2011/060995
PCT Pub. Date: May 26, 2011

(65) Prior Publication Data
US 2012/0310491 A1   Dec. 6, 2012

(30) Foreign Application Priority Data
Nov. 19, 2009   (BE) .................................. 2009/0719

(51) Int. Cl.
G06F 7/70      (2006.01)
G06F 19/00   (2006.01)
G06G 7/00    (2006.01)
G06G 7/76    (2006.01)

(52) U.S. Cl. ............. 701/50; 701/68; 192/3.61; 477/77; 477/175

(58) Field of Classification Search ............ 701/50, 701/67, 68, 70; 477/6, 77, 78, 79, 80, 90, 477/174, 175, 180, 181; 192/3.54, 3.55, 192/3.56, 3.57, 3.58, 3.59, 3.61, 3.63, 103 R
See application file for complete search history.

(56) References Cited

U.S. PATENT DOCUMENTS

| | | | |
|---|---|---|---|
| 8,046,140 B2 * | 10/2011 | Romine et al. ................ 701/51 |
| 2001/0036882 A1 * | 11/2001 | Hrazdera ..................... 477/166 |
| 2006/0191359 A1 * | 8/2006 | Tarasinski et al. ................ 74/11 |
| 2007/0207896 A1 * | 9/2007 | Radich .......................... 477/107 |

FOREIGN PATENT DOCUMENTS

JP    06011005 A   *   1/1994

* cited by examiner

Primary Examiner — Mary Cheung
Assistant Examiner — Rodney Butler
(74) Attorney, Agent, or Firm — Patrick M. Sheldrake

(57) ABSTRACT

A tractor has a control system configured for disengaging the clutch a first time, selecting a first transmission ratio of the change speed gearbox, engaging the clutch a first time to drive the PTO shaft determining the speed of the PTO shaft, disengaging the clutch a second time when the PTO shaft attains a predetermined first speed, selecting a second transmission ratio of the change speed gearbox and engaging the clutch a second time to drive the PTO shaft up to a desired second speed.

2 Claims, 2 Drawing Sheets

TRACTOR COMPRISING A CONTROL SYSTEM

This application is the U.S. National Stage filing of International Application Ser. No. PCT/EP2010/064798 filed on Oct. 5, 2010 which claims priority to Belgium Application BE2009/0719 filed Nov. 19, 2009, each of which is incorporated herein by reference in its entirety.

TECHNICAL FIELD

The present invention relates to a tractor having a power take-off (PTO) shaft driven by the engine of the tractor by way of a clutch and a change speed gearbox.

BACKGROUND ART

When a tractor is used for towing a baler, the PTO shaft of the tractor is coupled by way of a flywheel of the baler to a gearbox that drives the various mechanisms used in the baler to pick-up the crop from a field, to form the crop into bales and to wrap twine around the bales. A one-way clutch is arranged between the PTO shaft and the flywheel to allow the flywheel to rotate faster than the PTO shaft.

A large flywheel is required in a baler, especially in large square balers, to overcome peak loads encountered by the baler gearbox and this creates a problem when starting the baler. The PTO shaft when driven by the tractor engine at the speed at which it needs to turn to drive the baler cannot provide the high torque needed to bring the flywheel up to its steady speed. As a result, when the baler is hitched to the tractor and its flywheel is connected to the PTO shaft, the tractor engine stalls or a safety mechanism declutches the PTO from the tractor engine on account of the high load on the PTO shaft when the baler is started.

A solution to this problem proposed in EP1974601 is to use a hydraulic motor to supplement the torque provided by the PTO shaft when starting the baler flywheel. This solution is not entirely satisfactory because it requires modification of the baler and it also calls for a source of hydraulic fluid under pressure.

DISCLOSURE OF INVENTION

The present invention seeks to enable a tractor PTO shaft to be connected to a high inertia load, such as a baler, towed forage harvesters, wood choppers, grain blowers, without requiring modification of the towed implement while reducing the risk of the tractor engine stalling or the PTO overload mechanism being activated.

According to the present invention, there is provided a tractor comprising an engine and a power take-off (PTO) shaft driven by the engine by way of a clutch and a change speed gearbox, characterised in that the tractor further comprises a control system operably connected to control the engine, the clutch and the change speed gearbox and operative when actuated to perform the sequential steps of:
  disengaging the clutch a first time;
  selecting a first transmission ratio of the change speed gearbox;
  engaging the clutch a first time to drive the PTO shaft;
  determining the speed of the PTO shaft;
  disengaging the clutch a second time when the PTO shaft attains a predetermined first speed;
  selecting a second transmission ratio of the change speed gearbox; and
  engaging the clutch a second time to drive the PTO shaft up to a desired second speed.

Preferably, the control system is further operative to set the engine speed to a first value prior to the disengagement of the clutch the first time and to set the engine speed to a second value prior to the disengagement of the clutch the second time.

BRIEF DESCRIPTION OF DRAWINGS

The invention will now be described further, by way of example, with reference to the accompanying drawings, in which.

MODE(S) FOR CARRYING OUT THE INVENTION

Figure 1:
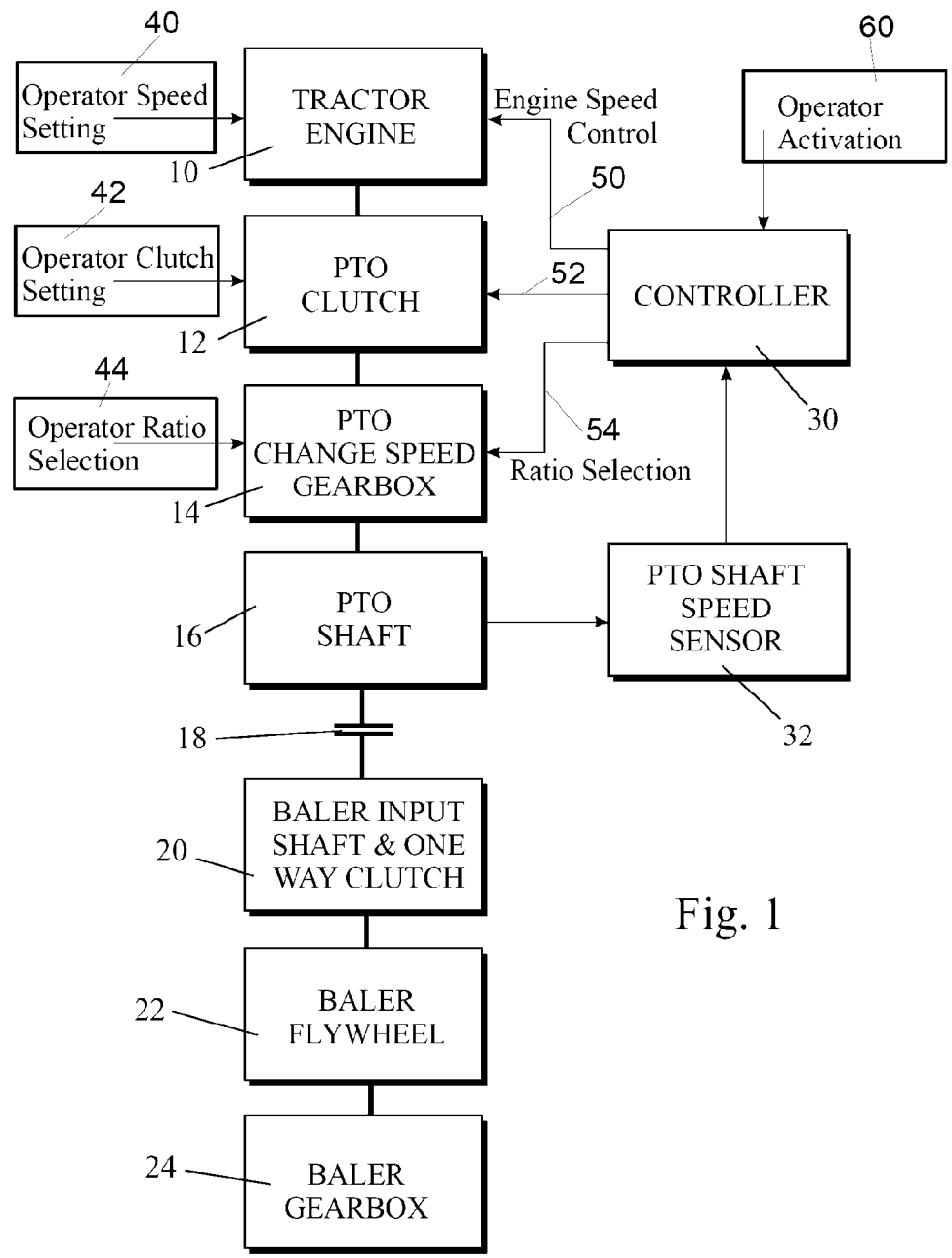
FIG. 1 is a block diagram of the drive train connecting the engine of a tractor to the gearbox of a baler.

The drawings do not show a tractor nor a baler, as both of these may be generally conventional. Instead, the components relevant to an understanding of the present invention have been represented schematically by blocks in FIG. 1.

Within the tractor, the engine 10 that drives the tractor through a drive train that is not represented in the drawing, also drives a power take-off (PTO) shaft 16 through a PTO clutch 12 and a change speed gearbox 14. As represented by three blocks 40, 42, 44, the operator has means to set the speed of the engine 10, to engage and disengage the PTO 12 clutch, and to select the gear ratio of the gearbox 14, which normal has a low gear, a high gear and a neutral position.

In the baler, an input shaft 20 that can be selectively coupled to the tractor PTO shaft 16 through a coupler 18, incorporates a one-way clutch. This input shaft 20 drives a flywheel 22 that is mounted on the input shaft of the baler gearbox 24. The baler gearbox has various output shafts that drive, the pick-up, baling and knotting mechanisms which are not represented in the drawing.

As so far described, the tractor and the baler are conventional and the present invention is only concerned with the process of connecting the baler to the PTO shaft of the tractor and starting the baler.

For an explanation of the problem addressed by the invention, certain speed and transmission ratio values will be given. It should be understood that these are given only by way of example of the typical values that are encountered in practice.

For normal operation of the baler, the PTO shaft is required to turn at a speed of 1000 rpm. To drive the PTO shaft at that speed, the tractor engine speed needs to be set at 2150 rpm and the ratio of the PTO gearbox at 2,15. Applying these settings and then engaging the PTO clutch 12, will often result in the engine stalling or the activation of the PTO safety mechanism because the engine cannot supply the torque needed to bring the baler flywheel 22 up to its working speed.

This problem has been recognised in the prior art and one known solution is to supplement the torque used to drive the bale flywheel by means of an auxiliary hydraulic motor. The present invention sets out to prevent stalling of the tractor engine or activation of a PTO safety mechanism without requiring modification to the baler, enabling the tractor to start up any implement that places a large inertial load on its PTO shaft.

In the present invention, a control system 30 is provided which receives an input signal 60 from the operator when it is desired to commence power delivery to the baler. The control system 30 also receives an input signal from the PTO shaft speed sensor 32 and produces output signals 50, 52, 54 to set the engine 10 speed, to engage and disengage the PTO clutch 12 and to select the transmission ratio of the PTO gearbox 14.

Figure 2:
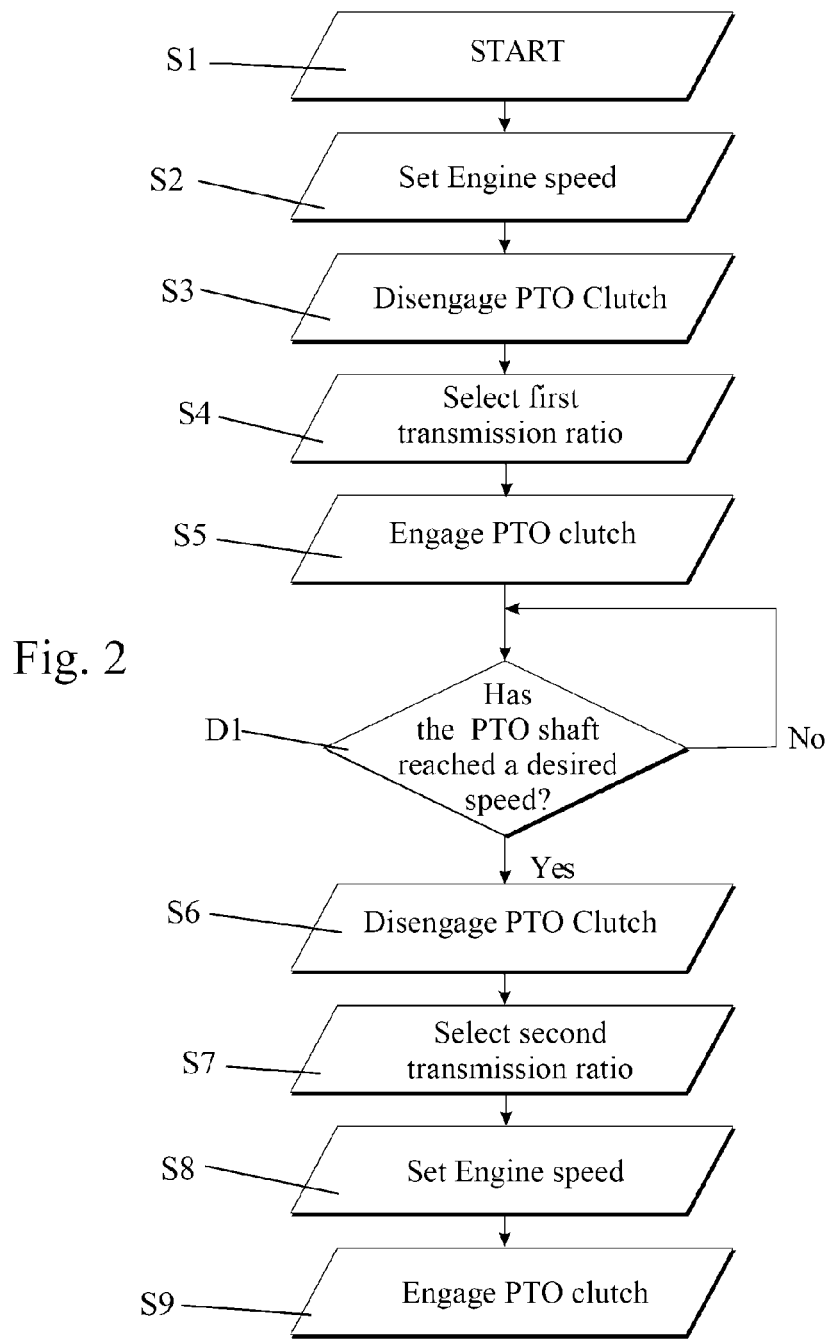
FIG. 2 is a flow chart showing the steps implemented by the control system in FIG. 1.

The control logic implemented by the control system 30 is shown in the form of a flow chart in FIG. 2.

At the time of coupling the PTO shaft 16 to the baler, the PTO gearbox 14 will have been in the neutral position and the engine of the tractor would be idling. After receiving in step S1 a signal from the operator to commence power delivery to the baler, the control system in step S2 sets the engine speed to 1950 rpm.

The control system then disengages the clutch 12 in step S3, selects the low transmission ratio of 3,61:1 of the PTO gearbox 14 in step S4 and reengages the clutch 12 in step S5 to transmit torque to the input shaft 20 of the baler and commence turning the flywheel 22. Because of the large inertia of the flywheel 22, the PTO output speed will increase only gradually towards the nominal 540 rpm at which the PTO shaft is being driven, i.e. 1950/3,61 rpm.

The speed of the PTO shaft is monitored in the decision block D1 and the control system waits until the PTO shaft reaches a desired speed which is a predetermined fraction, for example 95%, of the engine speed divided by the selected gear ratio of the PTO gearbox 14. With the numbers given here by way of example, the control system waits until the PTO shaft reaches about 515 rpm.

The control system then proceeds in step S6 to disengage the PTO clutch 12 a second time. Because of the inertia of the flywheel 22 and the one-way clutch in the input shaft 20, the flywheel 22 will at this point continue to turn at about its existing speed. The control system 30 next selects the higher transmission ratio, for example 2,15:1, of the gearbox 14 in step S7, and raises the engine speed to 2150 rpm in step S8. At the next reengaging of the clutch 12 in step S9 the PTO shaft 16 and the flywheel will be brought to their nominal 1000 rpm working speed without a risk of the engine stalling or activating the PTO safety mechanism.

The invention claimed is:

1. A tractor comprising an engine and a power take-off (PTO) shaft driven by the engine by way of a clutch and a change speed gearbox; and a control system operably connected to control the engine, the clutch and the change speed gearbox and configured when actuated to perform the steps of:

disengaging the clutch a first time;

selecting a first transmission ratio of the change speed gearbox;

engaging the clutch a first time to drive the PTO shaft;

determining the speed of the PTO shaft;

disengaging the clutch a second time when the PTO shaft attains a predetermined first speed;

selecting a second transmission ratio of the change speed gearbox; and engaging the clutch a second time to drive the PTO shaft up to a desired second speed.

2. A tractor as claimed in claim 1, wherein the control system has a configuration to set the engine speed to a first value prior to the disengagement of the clutch the first time and to set the engine speed to a second value prior to the disengagement of the clutch the second time.

\* \* \* \* \*